United States Patent
Sugaya

(10) Patent No.: US 7,796,325 B2
(45) Date of Patent: Sep. 14, 2010

(54) DISTRIBUTED RAMAN AMPLIFIER AND WDM OPTICAL TRANSMISSION SYSTEM

(75) Inventor: Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 12/003,493

(22) Filed: Dec. 26, 2007

(65) Prior Publication Data

US 2008/0158658 A1 Jul. 3, 2008

(30) Foreign Application Priority Data

Dec. 27, 2006 (JP) ............................. 2006-352539

(51) Int. Cl.
*H04B 10/17* (2006.01)
*H04B 10/12* (2006.01)

(52) U.S. Cl. ...................................... 359/334

(58) Field of Classification Search .................. 359/334
See application file for complete search history.

(56) References Cited

U.S. PATENT DOCUMENTS

| | | | | |
|---|---|---|---|---|
| 6,639,715 | B2* | 10/2003 | Naito et al. | 359/334 |
| 6,738,184 | B2* | 5/2004 | Hayashi et al. | 359/341.4 |
| 6,961,522 | B1* | 11/2005 | Castagnetti et al. | 398/92 |
| 2002/0105715 | A1* | 8/2002 | Naito et al. | 359/334 |
| 2002/0135866 | A1* | 9/2002 | Sasaoka et al. | 359/334 |
| 2004/0080812 | A1* | 4/2004 | Sugaya et al. | 359/334 |
| 2004/0156095 | A1* | 8/2004 | Tsuzaki et al. | 359/334 |
| 2004/0190123 | A1* | 9/2004 | Nakamura et al. | 359/337 |
| 2004/0196158 | A1* | 10/2004 | Sugaya et al. | 340/815.4 |
| 2005/0099676 | A1 | 5/2005 | Tokura et al. | 359/349 |
| 2005/0237600 | A1* | 10/2005 | Isshiki | 359/334 |

FOREIGN PATENT DOCUMENTS

| | | | | |
|---|---|---|---|---|
| EP | 1385280 | A2 * | 1/2004 | |
| EP | 1427075 | A2 * | 6/2004 | |
| EP | 1460737 | A1 * | 9/2004 | |
| JP | 2004061647 | A * | 2/2004 | |
| JP | 2004-193640 | | 7/2004 | |

* cited by examiner

*Primary Examiner*—Eric Bolda
(74) *Attorney, Agent, or Firm*—Staas & Halsey LLP

(57) ABSTRACT

In a distributed Raman amplifier according to the present invention, a WDM signal light and a reference light are supplied to one end of an optical transmission path to which a pumping light is supplied; the WDM signal light and the reference light, which are propagated through the optical transmission path, are subjected to the distributed Raman amplification; the powers of the WDM signal light and the reference light, which are output from the other end of the optical transmission path, are monitored; and pumping light sources are controlled based on the monitor result. A wavelength of the reference light is set within a gain band of the distributed Raman amplification but longer or shorter than a wavelength of the WDM signal light, and also, set to be in a wavelength region in which a fluctuation amount of a Raman gain in the wavelength of the reference light becomes equal to or smaller than ⅕ of a fluctuation amount of a Raman gain in the wavelength band of the WDM signal light. As a result, it is possible to realize a low-cost distributed Raman amplifier of a simple configuration, capable of realizing an automatic gain control with high precision and also capable of compensating for gain wavelength characteristics using a fixed gain equalizer.

7 Claims, 5 Drawing Sheets

DISTRIBUTED RAMAN AMPLIFIER AND WDM OPTICAL TRANSMISSION SYSTEM

BACKGROUND OF THE INVENTION

1. Field of the Invention

The present invention relates to a distributed Raman amplifier which supplies a pumping light to an optical transmission path to Raman amplify a wavelength division multiplexed (WDM) signal light, and a WDM optical transmission system using the distributed Raman amplifier, and in particular, to a technology for realizing an automatic gain control of the distributed Raman amplifier.

2. Description of the Related Art

In recent years, the setting up of photonic network by a WDM transmission technology has been practically realized. Further, there have been demanded the low-cost of total optical network by the extension of direct optical amplifying-repeating distance and the cost-reduction of network by the extension of regenerative repeating distance, and accordingly, the development of ultra-long distance of optical amplifying-repeating transmission has been progressed. On the other hand, with the speeding-up of transmission speed per wavelength (channel) from the existent 10 Gb/s to 40 Gb/s, there is also a trend to aim at the further low noise of optical amplification repeater, and for this purpose, further low noise optical amplification repeating devices need to be used. In a trunk WDM optical transmission system, a distributed Raman amplification technology is used in order to significantly improve the transmission path performance, and a distributed Raman amplifier (DRA) is one of low noise optical amplification repeating devices.

FIG. 7 is a diagram showing one example of a conventional WDM optical transmission system using the DRA. In this conventional WDM optical transmission system, a WDM signal light generated by an optical transmission apparatus (Tx) 101 is transmitted to an optical transmission path 102, to be transmitted up to an optical reception apparatus (Rx) 104 via a plurality of optical repeaters 103 arranged on the optical transmission path 102. Further, to the optical transmission path 102 in each repeating section, a pumping light Lp for Raman amplification which is output from a pumping light source (LD) 105 is supplied via a multiplexer 106, so that the WDM signal light propagated through the optical transmission path 102 in each repeating section is subjected to the distributed Raman amplification to be input to the latter stage optical repeater 103.

FIG. 8 is a diagram showing a configuration example of the DRA applied to each repeating section of the above conventional WDM optical transmission system. In the DRA 110 shown in this configuration example, pumping lights Lp1, Lp2 and Lp3 of different wavelengths are output from three pumping light sources 111, 112 and 113, and the respective pumping lights Lp1 to Lp3 are multiplexed by a multiplexer 114 to one pumping light to be supplied onto the optical transmission path 102 via a multiplexer 115. Further, on the latter stage of the multiplexer 115, a fixed gain equalizer (GEQ) is disposed for compensating for gain wavelength characteristics of the distributed Raman amplification in the optical transmission path 102.

It is known that, when an average gain of the distributed Raman amplification is changed, the gain wavelength characteristics thereof are also changed. FIG. 9 and FIG. 10 are diagrams each showing one example of gain wavelength characteristics change in the conventional DRA 110 shown in FIG. 8. To be specific, the gain wavelength characteristics of the DRA 110 are such that single-peaked gain bands, which respectively have peaks at wavelengths obtained by Raman shifting the respective wavelengths of the three pumping lights Lp1 to Lp3, are overlapped with each other, as shown in FIG. 9, and in shapes of the single-peaked gain bands, as the average gain becomes larger, changes in convexo-concave shapes corresponding to the pumping lights Lp1 to Lp3 become remarkable, as shown in FIG. 10.

Therefore, in the case where the gain wavelength characteristics of the DRA are compensated using the fixed GEQ as in the configuration example of FIG. 8, since only any one of the gain wavelength characteristics shown in FIG. 10 can be completely compensated, wavelength characteristics of the WDM signal light output from the GEQ are changed depending on an operating state of the DRA, and consequently, transmission characteristics of the distributed Raman amplified WDM signal light are degraded. In order to avoid such degradation, it is required to control the average gain of the DRA at constant. As means for simply realizing an automatic gain control of the DRA, it is considered that the supply power of the pumping light is controlled at constant.

However, according to the above realizing means, even when fiber characteristics, such as loss wavelength characteristics and the like, are changed due to the deterioration of optical fiber used for the optical transmission path, the DRA is operated at the constant pumping light power, and therefore, the gain wavelength characteristics of the DRA are changed, resulting in an error in the compensation by the fixed GEQ. Further, since Raman amplification efficiency is changed depending on types of optical fibers used for the optical transmission path, if the gain is changed for each fiber type of the optical transmission path, the gain wavelength characteristics of the DRA are changed, resulting in the error in the compensation by the feed GEQ, similarly to the above, which causes the degradation of transmission characteristics.

As a conventional technology for the automatic gain control of the DRA, in Japanese Unexamined Patent Publication No. 2004-193640, there has been proposed a technology for sending a reference light, which is not Raman amplified, to the optical transmission path together with a signal light of plural wavelengths; distributed Raman amplifying the signal light on the optical transmission path, demultiplexing the reference light from the light propagated through the optical transmission path to detect a level thereof; and calculating a control target value of a signal light level based on the level of the reference light to control the pumping light, thereby realizing a constant average gain and constant wavelength characteristics, irrespectively of the optical fiber or the signal light level.

However, in the conventional technology for controlling the pumping light utilizing the reference light which is not Raman amplified, since a wavelength of the reference light is set in a region considerably separated from a wavelength band of the signal light, characteristics, for example, a loss coefficient of the optical transmission path and the like, are different between the signal light and the reference light, so that a significant error occurs between the signal light level and the reference light level at an output point of the optical transmission path. Therefore, there are problems in that, even if the pumping light is controlled based on the reference light level detected at the output point, it is difficult to realize with high precision the automatic gain control of the DRA, and, accordingly, it is hard to compensate for the gain wavelength characteristics of the DRA by the fixed GEQ irrespectively of types, characteristic changes or the like of fibers used for the optical transmission path.

SUMMARY OF THE INVENTION

The present invention has been accomplished in view of the above problems and has an object to provide a low-cost distributed Raman amplifier of simple configuration, capable of realizing an automatic gain control with high precision and of compensating for gain wavelength characteristics using a fixed gain equalizer, and to provide a WDM optical transmission system using such a distributed Raman amplifier.

In order to achieve the above object, a distributed Raman amplifier according to the present invention comprises: a pumping light generating section that generates a pumping light for distributed Raman amplifying a WDM signal light propagated through an optical transmission path; a pumping light supply section that supplies the pumping light output from the pumping light generating section in a direction opposite to a propagation direction of the WDM signal light; and a gain equalizer which receives the WDM signal light propagated through the optical transmission path to be subjected to the distributed Raman amplification, and has fixed transmission wavelength characteristics capable of flattening gain wavelength characteristics of the distributed Raman amplification, and further comprises: a reference light source which generates a reference light having a wavelength set within a gain band of the distributed Raman amplification but longer or shorter than a wavelength of the WDM signal light; a multiplexer which multiplexes the reference light output from the reference light source with the WDM signal light to supply the multiplexed light to one end of the optical transmission path; a monitor section that monitors the powers of the WDM light and the reference light, which are output from the other end of the optical transmission path; and a control section that obtains a Raman gain in the WDM signal light and a Raman gain in the reference light based on the monitor result in the monitor section, to control the pumping light generating section so that a difference between the Raman gains is maintained at constant, wherein the wavelength of the reference light is set in a wavelength region in which, when an average gain of the distributed Raman amplification is changed, a fluctuation amount of the Raman gain in the wavelength of the reference light becomes equal to or smaller than ⅕ of a fluctuation amount of the Raman gain in the wavelength band of the WDM signal light.

In the distributed Raman amplifier of the above configuration, the WDM signal light and the reference light output from the reference light source are multiplexed by the multiplexer to be supplied to the one end of the optical transmission path. To the optical transmission path, the pumping light output from the pumping light generating section is supplied in the direction opposite to the propagation direction of the WDM signal light by the pumping light supply section, and both of the WDM signal light and the reference light, which are propagated through the optical transmission path, are distributed Raman amplified. Then, the power of the WDM signal light and the power of the reference light, which are output from the other end of the optical transmission path, are monitored by the monitor section, and based on the monitor result, the Raman gain in the WDM signal light and the Raman gain in the reference light are obtained by the control section, and further, the pumping light generating section is controlled so that a ratio between the Raman gains is maintained at constant. As a result, the average gain of the distributed Raman amplification in the optical transmission path is controlled at constant, and the Raman amplified WDM signal light at constant gain is input to the fixed gain equalizer, so that the Raman gain wavelength characteristics are compensated, and the WDM signal light of flat wavelength characteristics is output from the gain equalizer.

Further, it is preferable that the wavelength of the reference light in the above distributed Raman amplifier is set on the longer wavelength side of the WDM signal light. In such a configuration, since the wavelength of the reference light is set near the wavelength band of the WDM signal light, an automatic gain control by the control section is performed with higher precision.

In a WDM optical transmission system according to the present invention, for transmitting a WDM signal light generated by an optical transmission apparatus to repeatedly transmit the WDM signal light up to an optical reception apparatus via a plurality of optical repeaters arranged on the optical transmission path, the above distributed Raman amplifier is arranged in each repeating section corresponding to each of the plurality of optical repeaters.

According to the distributed Raman amplifier of the present invention as described in the above, since the average gain of the distributed Raman amplification can be controlled at constant, irrespectively of types, characteristic changes and the like of fibers used for the optical transmission path, it becomes possible to compensate with high precision for the gain wavelength characteristics of the distributed Raman amplification by the fixed gain equalizer. According to the WDM optical transmission system which applies such a distributed Raman amplifier to each repeating section, a compensation error in the wavelength characteristics of the Raman gain in each repeating section is significantly reduced, and therefore, it becomes possible to realize excellent transmission characteristics.

The other objects, features and advantages of the present invention will be apparent from the following description of the embodiments with reference to the accompanying drawings.

DETAILED DESCRIPTION OF THE INVENTION

Hereinafter, an embodiment of the present invention will be described with reference to drawings.

Figure 1:
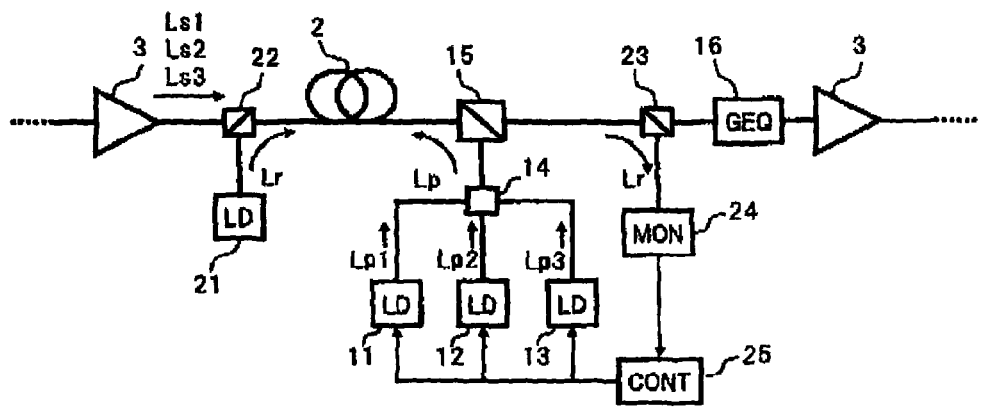
FIG. 1 is a diagram showing a configuration of one embodiment of a distributed Raman amplifier (DRA) according to the present invention.
Figure 2:
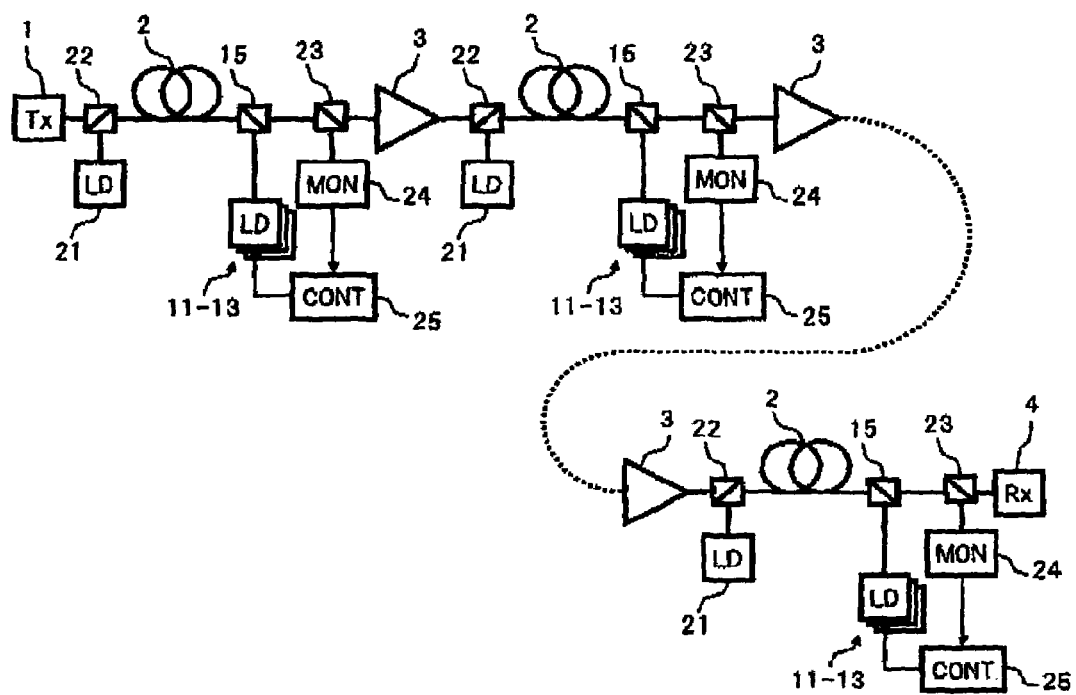
FIG. 2 is a diagram showing an entire configuration of a WDM optical transmission system using the DRA in FIG. 1.

FIG. 1 is a diagram showing a configuration of one embodiment of a distributed Raman amplifier according to the present invention. Further, FIG. 2 is a diagram showing an entire configuration of a WDM optical transmission system using the distributed Raman amplifier in FIG. 1.

Figure 8:
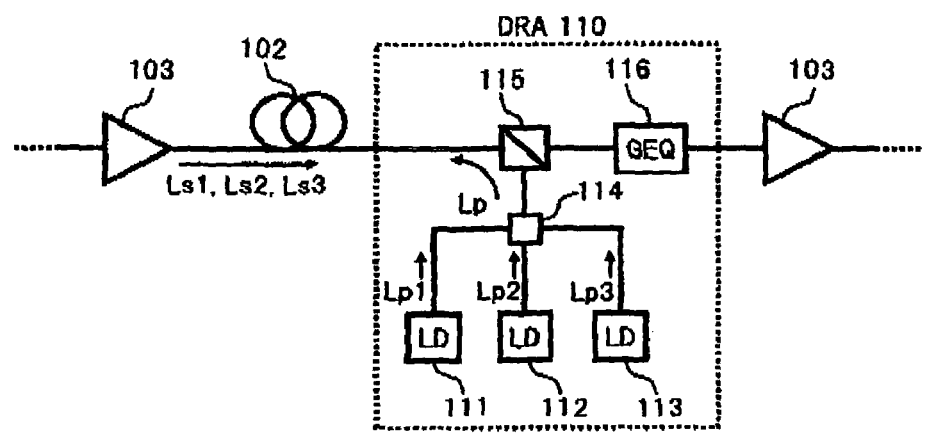
FIG. 8 is a diagram showing a configuration example of a conventional DRA applied to each repeating section in FIG. 7.
Figure 9:
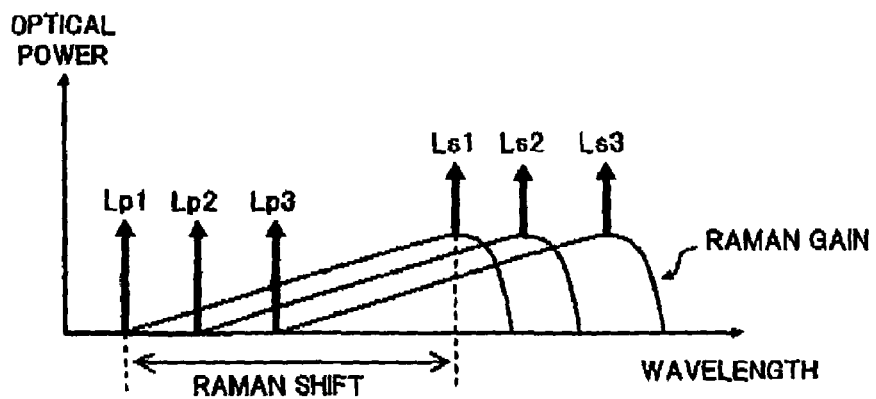
FIG. 9 is a diagram showing wavelengths of signal lights and pumping lights in the DRA of FIG. 8.
Figure 10:
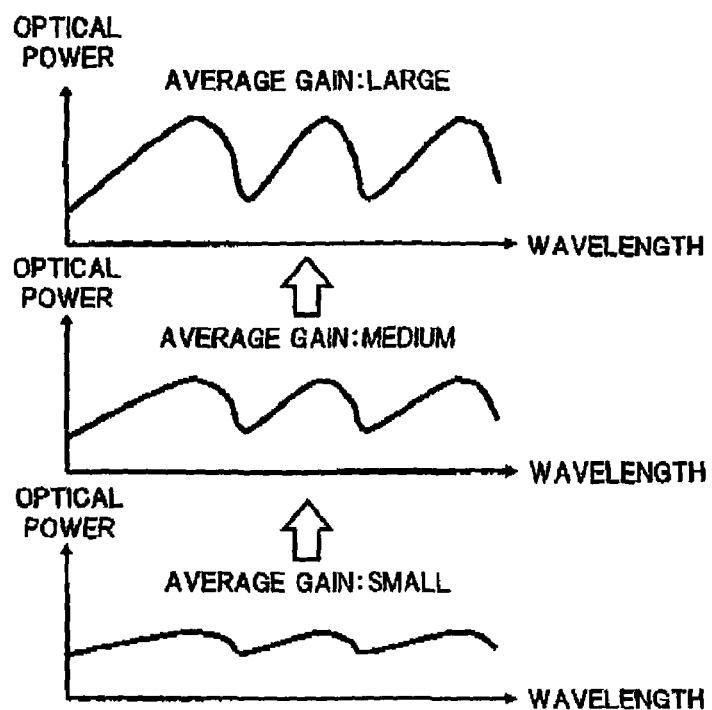
FIG. 10 is a graph showing one example of changes in gain wavelength characteristics in the DRA of FIG. 8.

In FIG. 1, the present distributed Raman amplifier (DRA) comprises, for example: a reference light source 21, a multiplexer 22, a branching device 23, a monitor section (MON) 24 and a control section (CONT) 25, in addition to pumping light sources (LD) 11, 12 and 13; multiplexers 14 and 15; and a gain equalizer (GEQ) 16, which are similar to those in a conventional configuration shown in FIG. 8.

The pumping light sources 11 to 13 respectively generate pumping lights Lp1 to Lp3 of different wavelengths to output them to the multiplexer 14. The multiplexer 14 multiplexes the pumping lights Lp1 to Lp3. The multiplexer 15 supplies a pumping light Lp which is obtained by multiplexing the pumping lights Lp1 to Lp3 in the multiplexer 14 to an optical transmission path 2 from the signal light output end side, to propagate the pumping light Lp in a direction opposite to a direction of a WDM signal light propagated through the optical transmission path 2. Herein, the pumping light sources 11 to 13 correspond to a pumping light generating section, and the multiplexers 14 and 15 correspond to a pumping light supply section. Further, the WDM signal light propagated through the optical transmission path 2 contains, for example, three waves signal lights Ls1, Ls2 and Ls3 of different wavelengths. The respective wavelengths of the pumping lights Lp1 to Lp3 are set according to a wavelength band of the WDM signal light.

Incidentally, herein, there is shown one example in which the three waves pumping lights Lp1 to Lp3 are supplied to the optical transmission path 2. However, the present invention is not limited thereto, and it is possible to arbitrarily set the number of pumping lights according to the wavelength band of the WDM signal light.

The reference light source 21 generates a reference light Lr which is used as a reference for when a Raman gain is estimated In the control section 25 (to be described later), to output ft to the multiplexer 22. A wavelength of the reference light Lr is set within a gain band of the distributed Raman amplification but longer or shorter than the wavelength of the WDM signal light, and also, is set in a wavelength region in which, when an average gain of the DRA is changed, a fluctuation amount of the Raman gain in the wavelength of the reference light Lr becomes equal to or smaller than $\frac{1}{5}$ of a fluctuation amount of the Raman gain in the wavelength band of the WDM signal light. Further, the power of the reference light Lr is set at a level equal to or higher than a level which can be detected by the monitor section 24 (to be described later) after the reference light Lr is propagated through the optical transmission path 2. Incidentally, in order to enable the reliable detection of the reference light Lr in the monitor section 24, the reference light Lr sent from the reference light source 21 to the optical transmission path 2 via the multiplexer 22 may be modulated.

The multiplexer 22 multiplexes the WDM signal light output from an optical repeater 3 (or an optical transmission apparatus 1) positioned on the upstream of the optical transmission path 2, and the reference light Lr output from the reference light source 21, to supply the multiplexed light to a signal light input end of the optical transmission path 2.

The branching device 23 is arranged on the latter stage of the multiplexer 15, and branches a part of the light sent from the multiplexer 15 to the GEQ 16 to output the branched light to the monitor section 24. The monitor section 24 uses the output light from the branching device 23 to monitor the total power of the WDM signal light and the power of the reference light Lr, which are distributed Raman amplified, to thereby output a signal indicating the monitor result to the control section 25.

The control section 25 obtains the Raman gain in the WDM signal light and the Raman gain in the reference light Lr, based on the total power of the WDM signal light and the power of the reference light Lr, which are indicated by the output signal from the monitor section 24, and generates signals for controlling the respective pumping light sources 11 to 13 so that a ratio between the Raman gains is maintained at constant, to output the control signals to the pumping light sources 11 to 13. Contents of specific processing executed by the control section 25 will be described later.

The GEQ 16 is a passive optical part having fixed transmission wavelength characteristics capable of canceling gain wavelength characteristics in the average gain which is controlled at constant by the control section 25.

As shown in FIG. 2 for example, the DRA of the above configuration is arranged in each repeating section of the WDM optical transmission system. Herein, the WDM optical transmission system is in a system configuration in which the WDM signal light containing the signal lights Ls1 to Ls3 is generated in the optical transmission apparatus (Tx) 1 to be transmitted to the optical transmission path 2, and the WDM signal light is repeatedly transmitted up to an optical reception apparatus (Rx) 4 via the plurality of optical repeaters 3 each arranged on the optical transmission path 2, and the WDM signal light propagated through the optical transmission path 2 in each repeating section is distributed Raman amplified by the above automatically gain controlled DRA.

In the DRA shown in FIG. 1, the WDM signal light containing the signal lights Ls1 to Ls3 output from the former stage optical repeater 3 (or the optical transmission apparatus 1) and the reference light Lr output from the reference light source 21 are multiplexed by the multiplexer 22, to be input to the optical transmission path 2. At the time, as described in the above, the wavelength of the reference light Lr which is input to the optical transmission path 2 together with the WDM signal light, is set in the wavelength region in which, when the average gain of the DRA is changed, the fluctuation amount of the Raman gain in the wavelength of the reference light Lr becomes equal to or smaller than $\frac{1}{5}$ of the fluctuation amount of the Raman gain in the wavelength band of the signal lights. To be specific, for example in the case where the Raman gain in the wavelength band of the signal lights is fluctuated by 5 dB on average due to the change in the average gain of the DRA, a region in which the fluctuation of the Raman gain is suppressed to 1 dB or less is specified on the longer or shorter wavelength than the signal lights, and the wavelength of the reference light Lr is set in such a specified wavelength region.

Figure 3:
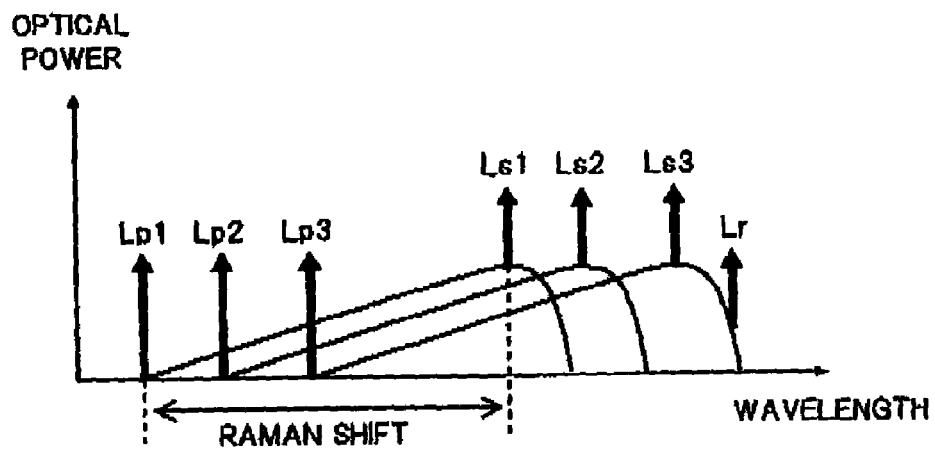
FIG. 3 is a diagram showing one example of the wavelength allocation of signal lights, pumping lights and a reference light in the above embodiment.

The wavelength of such a reference light Lr can be set, as shown in FIG. 3 for example, on the longer wavelength side of the signal light Ls3 having the longest wavelength in the wavelength region, at which the Raman gain is abruptly reduced, or on the shorter wavelength side of the signal light Ls1 having the shortest wavelength in the wavelength region, at which the Raman gain is gently reduced (not shown in the figure). However, considering wavelength dependence or the like of a loss coefficient of an optical fiber used for the optical transmission path 2, the wavelength of the reference light Lr is set in a region as close to the wavelength band of the signal lights so that an error of the reference light to the signal lights can be reduced. Therefore, it is desirable to set the wavelength of the reference light Lr on the longer wavelength side in the wavelength region, at which the Raman gain is abruptly reduced. Describing a specific setting example, in the case where the respective wavelengths of the signal lights Ls1 to Ls3 are 1635 nm, 1548 nm and 1560 nm, it is possible to set the wavelength of the reference light Lr at 1810 nm or the like. However, the present invention is not limited to the above setting example.

As described in the above, the wavelength of the reference light Lr is set in the wavelength region in which, when the average gain of the DRA is changed, the fluctuation amount of the Raman gain in the wavelength of the reference light Lr becomes equal to or smaller than $1/5$ of the fluctuation amount of the Raman gain in the wavelength band of the signal light. A need for the fluctuation amount of the Raman gain to be equal to or smaller than $1/5$, is an issue of the Raman control precision. Essentially, the reference light is completely outside of the Raman gain band, and therefore, is optimum to be set in the wavelength region in which the reference light is not absolutely influenced by the Raman gain in the signal light. However, in such a case, as described in the above, an increase in a difference between the loss coefficients greatly affects a control error. Accordingly, it is necessary to set for the wavelength of the reference light, a region in which an Influence by the signal light gain is restricted at minimum while restricting a loss coefficient error at minimum (that is, decreasing a difference from the wavelength of the signal light).

Since the reference light is a reference level for the above automatic gain control operation, an error in the reference light directly leads the control error. For example, in the case where the signal light is fluctuated by 1 dB, the reference light is changed by 0.2 dB in response to such fluctuation. In the case where the control error target specification is about 0.5 dB, a reference light level error is 0.2 dB if a monitor error component 0.3 dB is subtracted. Accordingly, a level equal to or lower than $1/5$ of the main signal light gain is adequate in view of the control error. Incidentally, the supposition that the signal light is fluctuated by 1 dB means the supposition of a cumulative value of a control error in another node on the transmission system.

As the wavelength allocation for realizing the above content, it is possible to set, for example, a wavelength range of the signal light at 1530 nm to 1565 nm, to thereby arrange the pumping light so that the wavelength range of the signal light can be flatly amplified (for example, at 1425 nm, 1440 nm or 1455 mm), and the reference light at 1610 nm. According to this wavelength allocation, a normal single mode fiber (SMF) is used as the transmission path for the reference light, so that the gain at $1/5$ of the signal light can be realized. Further, for loss wavelength characteristics, in the normal SMF for example, a loss coefficient thereof has values of 0.206 dB/km for 1530 nm, 0.198 db/km for 1565 nm and 0.205 dB/km for 1610 nm. Accordingly, the lose coefficient in the reference light wavelength 1610 nm is approximately same as the loss coefficient in the shortest wavelength 1530 nm of the signal light wavelength, and can be restricted at minimum as the loss error in the same transmission path. As a result, the above wavelength allocation of the reference light is the optimum wavelength allocation example in the present invention, since it satisfies the following two conditions (I) and (ii).

(i) The reference light receives the gain equal to or smaller than $1/5$ of the gain in the signal light.

(ii) The loss coefficient in the wavelength of the reference light in the applied optical transmission path is approximately same of the loss coefficient in the wavelength of the signal light.

Figure 4:
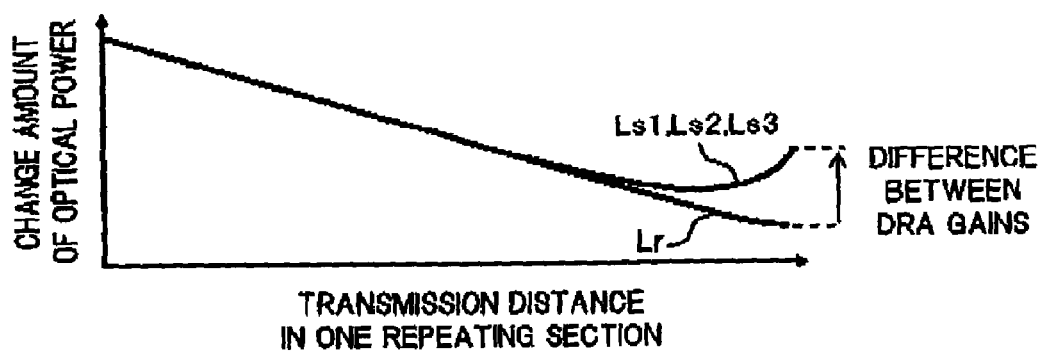
FIG. 4 is a diagram typically showing power change amounts of the signal light and the reference light, which are propagated through an optical transmission path, according to transmission distances in the above embodiment.

To the optical transmission path 2 to which the WDM signal light and the reference light Lr are input, the pumping lights Lp1 to Lp3 from the pumping light sources 11 to 13 are supplied from the signal light output end side via the multiplexers 14 and 15, so that both of the WDM signal light and the reference light Lr, which are propagated through the optical transmission path 2, are distributed Raman amplified. FIG. 4 typically shows change amounts of optical powers of the signal lights Ls1 to Ls3 and the reference light Lr, which are propagated through the optical transmission path 2, according to transmission distances. As shown in FIG. 4, the optical powers of the signal lights Ls1 to Ls3 and the reference light Lr are gradually reduced due to a transmission loss of the optical fiber in a former portion of the optical transmission path 2, but the optical powers of the signal lights Ls1 to Ls3 are increased due to Raman amplification effects by the pumping lights Lp1 to Lp3 in a latter portion of the optical transmission path 2. Note, the reference light Lr is also Raman amplified, but the Raman gain of the reference light Lr is smaller than those of the signal lights Ls1 to Ls3, and herein, since the transmission loss of the optical fiber becomes larger than the Raman gain of the reference light Lr, the power of the reference light Lr is reduced also in the latter portion of the optical transmission path 2.

The WDM signal light and the reference light Lr, which are propagated through the optical transmission path 2 to be output from the signal light output end, pass through the multiplexer 16 to be sent to the GEQ 16, and also, a part thereof is branched by the branching device 23 to be sent to the monitor section 24. In the monitor section 24, the total power of the WDM signal light and the power of the reference light Lr, contained in the light output from the branching device 23, are detected respectively, and a signal indicating the detection result is output to the control section 25. In the control section 25, based on the total power of the WDM signal light and the power of the reference light Lr, which are indicated in the output signal from the monitor section, the Raman gain is estimated, and the pumping light sources 11 to 13 are controlled based on the estimation result, so that an automatic gain control is performed on the DRA.

Figure 5:
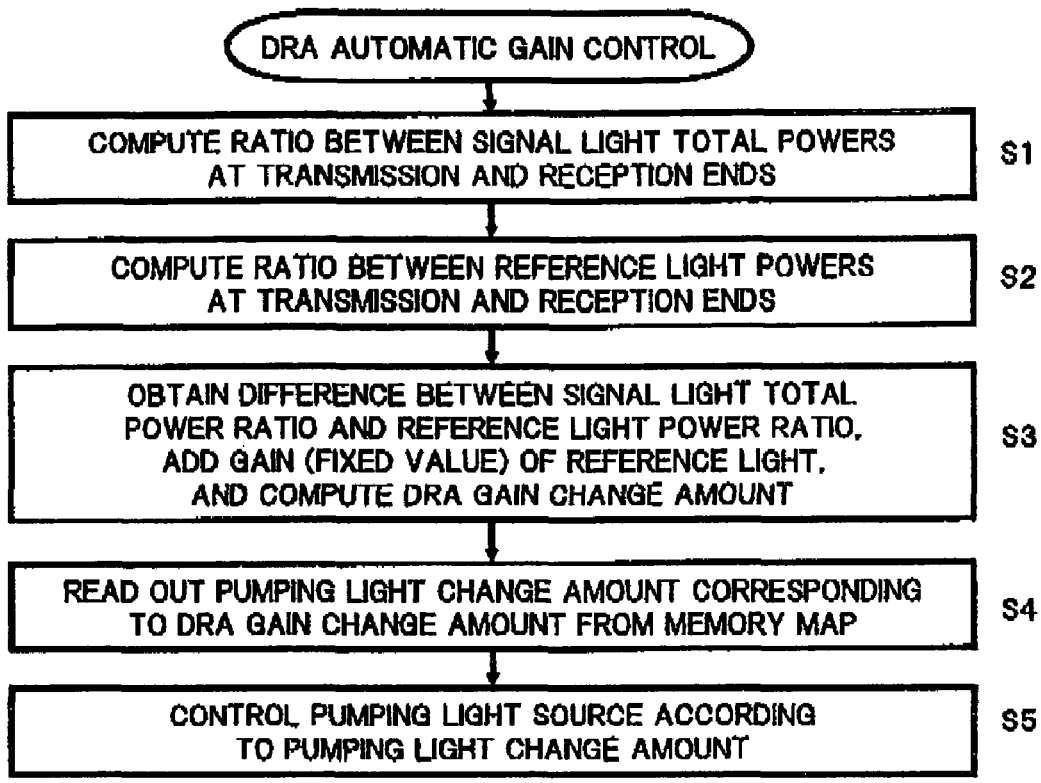
FIG. 5 is a flowchart showing one example of an automatic gain control performed by a control section in the above embodiment.

Here, there will be described in detail one example of the automatic gain control by the control section 25 referring to a flowchart of FIG. 5.

The control section 25 receives the output signal from the monitor section 24 to judge the total power of the WDM signal light and the power of the reference light Lr at the signal light output end (to be referred to as "reception and", hereunder) of the optical transmission path 2, and also, reads set values, which are previously stored in a memory or the like (not shown in the figure), of the total power of the WDM signal light and the power of the reference light Lr at the signal light input end (to be referred to as "transmission end", hereunder) of the optical transmission path 2. Then, using such information, firstly in step 1 (to be indicated as S1 in the figure and same rule will be applied to subsequent steps), a ratio of the total power of the WDM signal light at the reception end to the total power of the WDM signal light at the transmission end (a difference between the total powers of the WDM signal light at the transmission end and the reception end, in the case where the total powers are displayed in dB) is computed. Further, in step 2, a ratio of the power of the reference light Lr at the reception end to the power of the reference light Lr at the transmission end (a difference between the powers of the reference light Lr at the transmission end and the reception end, in the case where the powers of the reference light Lr are displayed in dB) is computed.

Then, in step 3, after a difference between the signal light total power ratio computed in step 1 and the reference light power ratio computed in step 2 is obtained, the Raman gain (which is previously set as a fixed value) of the reference light Lr is added to this difference, so that a gain change amount of the DRA is computed.

Next, in step 4, change amounts of the powers of the pumping lights Lp1 to Lp3 corresponding to the gain change amount of the DRA computed in step 3 are read out from map information previously stored in the memory or the like. Incidentally, this memory map information can be prepared by applying a technology disclosed in Japanese Unexamined Patent Publication No. 2002-072262 or the like.

Lastly, in step 5, driving states of the pumping light sources 11 to 13 are controlled according to the change amounts of the powers of the pumping lights Lp1 to Lp3 read out in step 4. As a result, the average gain of the DRA is controlled at constant, irrespectively of types, characteristic changes and the like of fibers used for the optical transmission path.

Figure 6:
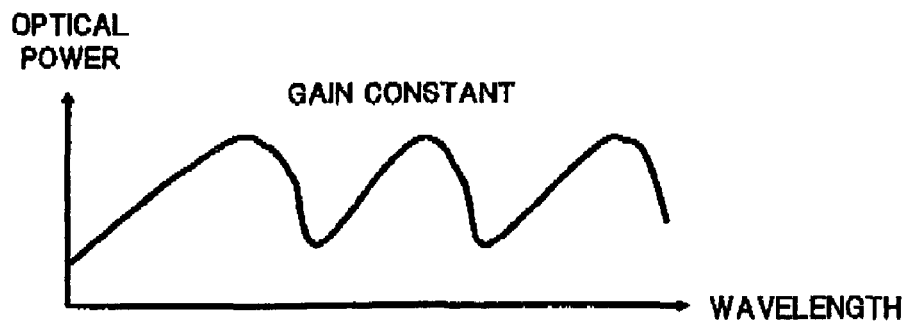
FIG. 6 is a graph showing one example of gain wavelength characteristics of the DRA in the above embodiment.
Figure 7:
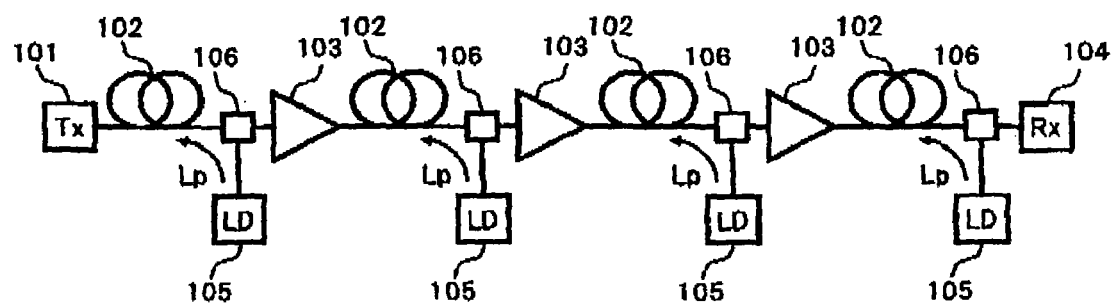
FIG. 7 is a diagram showing one example of conventional WDM optical transmission systems.

By the above automatic gain control by the control section 25, in gain wavelength characteristics of the DRA, as shown In FIG. 6 for example, a convexo-concave shape thereof corresponding to the constant average gain is maintained. By optimally designing the transmission wavelength characteristics of the fixed GEQ 16 so as to cancel such gain wavelength characteristics of the DRA, it becomes possible to compensate with high precision for the gain wavelength characteristics of the DRA by the GEQ 16. Thus, it becomes possible to reliably output the signal lights Ls1 to Ls3 of which wavelength characteristics are flattened to the latter stage optical repeater 3 (or the optical reception apparatus 4) from the GEQ 16. Further, the compensation of the gain wavelength characteristics in the present DRA is realized using the fixed GEQ 16 being the passive optical part, and therefore, it is possible to provide a low-cost DRA of a simple configuration.

Consequently, in the WDM optical transmission system in which the DRA as described in the above is disposed in each repeating section, a compensation error in the gain wavelength characteristics of the DRA, which has been conventionally caused by types, characteristic changes and the like of fibers used for the optical transmission path 2, is significantly improved, and accordingly, it becomes possible to realize excellent transmission characteristics.

Incidentally, in the above embodiment, there has been shown the one example in which the reference light Lr having the relatively small Raman gain change amount is used only as the reference for when the Raman gain in the signal light wavelength band is estimated. However, it is also possible to realize, for example, a function as transmission path loss detecting means for detecting a loss (span loss) in the optical transmission path 2 utilizing the above reference light Lr. In this case, it is preferable that the power of the reference light Lr is monitored at the transmission end of the optical transmission path 2, and the monitor result is transmitted to the control section 25 on the reception end side utilizing a supervisory signal or the like transmitted between adjacent optical repeaters. As a result, in the control section 25, it becomes possible to accurately obtain the span loss between the repeating sections using the monitor values of the reference light power at the transmission and reception ends and the Raman gain (fixed value) of the reference light Lr.

Further, the above reference light Lr can be utilized as a signal for realizing an APR (Auto Power Reduction) function defined by ITU-T_G 664 for example. Namely, it is also possible to realize a control such that, when the reference light Lr is no longer detected by the monitor section 24 on the reception end, it is judged that an abnormality, such as a breakage or the like of the optical transmission path 2, occurs, and the pumping light power is reduced down to a safety level, and thereafter, when the reference light Lr is again detected by the monitor section 24, it is judged that the optical line is restored, and the pumping light power is returned to a normal operating level.

What is claimed is:

1. A distributed Raman amplifier comprising:
   a pumping light generating section that generates a pumping light for distributed Raman amplifying a WDM signal light propagated through an optical transmission path;
   a pumping light supply section that supplies the pumping light output from said pumping light generating section in a direction opposite to a propagation direction of the WDM signal light; and
   a gain equalizer which receives the WDM signal light propagated through said optical transmission path to be subjected to the distributed Raman amplification, and has fixed transmission wavelength characteristics capable of flattening gain wavelength characteristics of the distributed Raman amplification,
   said distributed Raman amplifier further comprising;
   a reference light source which generates a reference light having a wavelength set within a gain band of the distributed Raman amplification but longer or shorter than a wavelength of the WDM signal light;
   a multiplexer which multiplexes the reference light output from said reference light source with the WDM signal light to supply the multiplexed light to one end of said optical transmission path;
   a monitor section that monitors the powers of the WDM light and the reference light, which are output from the other end of said optical transmission path; and
   a control section that obtains a Raman gain in the WDM signal light and a Raman gain in the reference light based on the monitor result in said monitor section, to control said pumping light generating section so that a difference between the Raman gains is maintained at constant,
   wherein the wavelength of the reference light is set in a wavelength region in which, when an average gain of the distributed Raman amplification is changed, a fluctuation amount of the Raman gain in the wavelength of the reference light becomes equal to or lower than $\tfrac{1}{5}$ of a fluctuation amount of the Raman gain in the wavelength band of the WDM signal light.

2. A distributed Raman amplifier according to claim 1, wherein the wavelength of the reference light is set on the longer wavelength side of the WDM signal light.

3. A distributed Raman amplifier according to claim 1, wherein said pumping light generating section includes a plurality of pumping light sources generating a plurality of pumping lights of different wavelengths, and
   said pumping light supply section includes: a first multiplexer which multiplexes the respective pumping lights output from said plurality of pumping light sources; and a second multiplexer which supplies a pumping light obtained by multiplexing the respective pumping lights by said first multiplexer to the other end of said optical transmission path.

4. A distributed Raman amplifier according to claim 1, wherein the reference light is modulated.

5. A distributed Raman amplifier according to claim 1, further comprising;
    transmission pass loss detecting means for detecting a loss in said optical transmission path using the reference light.

6. A distributed Raman amplifier according to claim 1, further comprising;
    APR control means for detecting using the reference light whether or not an abnormality occurs in said optical transmission path, and controlling the pumping light power to a predetermined level or less when the abnormality occurs.

7. A WDM optical transmission system for transmitting a WDM signal light generated in an optical transmission apparatus to an optical transmission path to repeatedly transmit the WDM signal light up to an optical reception apparatus via a plurality of optical repeaters arranged on said optical transmission path,
    wherein the distributed Raman amplifier recited in claim 1 is arranged in each repeating section corresponding to each of said plurality of optical repeaters.

* * * * *